United States Patent
Yoshimura et al.

(10) Patent No.: US 10,271,476 B2
(45) Date of Patent: Apr. 30, 2019

(54) WALK BEHIND MOWER

(71) Applicant: HONDA MOTOR CO., LTD., Tokyo (JP)

(72) Inventors: Hajime Yoshimura, Wako (JP); Yasumi Fukuzumi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 95 days.

(21) Appl. No.: 15/455,309

(22) Filed: Mar. 10, 2017

(65) Prior Publication Data

US 2017/0265386 A1 Sep. 21, 2017

(30) Foreign Application Priority Data

Mar. 17, 2016 (JP) .................. 2016-053444

(51) Int. Cl.
*A01D 34/68* (2006.01)
*A01D 34/69* (2006.01)
*A01D 34/71* (2006.01)
*A01D 34/73* (2006.01)
*A01D 101/00* (2006.01)
*A01D 34/86* (2006.01)

(52) U.S. Cl.
CPC ......... *A01D 34/6812* (2013.01); *A01D 34/69* (2013.01); *A01D 34/71* (2013.01); *A01D 34/73* (2013.01); *A01D 34/86* (2013.01); *A01D 2034/6843* (2013.01); *A01D 2101/00* (2013.01)

(58) Field of Classification Search
CPC ................................................. A01D 34/6812
See application file for complete search history.

(56) References Cited

U.S. PATENT DOCUMENTS

| 2,888,114 | A | 5/1959 | Bostock |
| 7,669,702 | B2 | 3/2010 | Blanchard |
| 2002/0148701 | A1* | 10/2002 | Nickel ............... F16D 43/18 192/105 BA |
| 2006/0060017 | A1 | 3/2006 | Ruebusch et al. |
| 2007/0000348 | A1 | 1/2007 | Blanchard |
| 2015/0337924 | A1* | 11/2015 | Teillet ............... F16H 3/083 74/650 |

FOREIGN PATENT DOCUMENTS

| DE | 1297384 | 6/1969 |
| EP | 1258185 A1 | 11/2002 |

OTHER PUBLICATIONS

Extended European Search Report for Application No. 17160888.8, dated Jul. 26, 2017, 6 pages.

* cited by examiner

*Primary Examiner* — Jacob S. Scott
*Assistant Examiner* — Murad Jahmani
(74) *Attorney, Agent, or Firm* — Armstrong Teasdale LLP

(57) ABSTRACT

In a walk behind mower (10), a clutch actuating mechanism (24) and a dog clutch (23) is included in the power transmission path for the driven wheels (13). The dog clutch includes an input end (23a) provided with teeth (231), an output end (23b) provided with teeth (232) configured to selectively mesh with the teeth of the first clutch half, and a spring member (26) interposed between the first clutch half and the second clutch half to normally urge the two clutch halves away from each other. The clutch actuating mechanism is configured to displace the two clutch halves toward each other against a biasing force of the spring member by using a drive force transmitted from the power source to the clutch actuating mechanism.

5 Claims, 8 Drawing Sheets

WALK BEHIND MOWER

TECHNICAL FIELD

The present invention relates to a walk behind lawn mower provided with at least one driven wheel for propelling the mower.

BACKGROUND ART

A walk behind lawn mower is typically provided with a pair of rear wheels that can be selectively powered by pivoting a drive lever consisting of a half-loop lever provided on a handlebar of the mower toward the cross member of the handlebar. A drive clutch is provided between the engine of the mower and the rear wheels, and the drive lever enables the operator to selectively disconnect the transmission path between the engine and the rear wheels by means of the drive clutch.

The dog clutch is known in the art, and has the advantage of being compact and simple in structure. U.S. Pat. No. 7,669,702 discloses the use of a pair of dog clutches to accommodate the difference in the rotational speed between the two rear wheels during the cornering of the mower.

During the normal mowing operation, the driven rear wheels are highly effective in reducing the effort required by the operator. However, when mowing the grass on a slope, the operator may desire to selectively power the rear wheels. More specifically, whereas it is desirable to power the rear wheels when mowing uphill, it is desirable to disconnect the power when mowing downhill. When mowing the grass on a slope, the operator typically stands under the slope, and pushes the mower uphill using the power of the engine and pulls back the mower downhill using the gravitational force with the power to the rear wheels disconnected. Pushing and pulling the mower back and forth also occur in other situations such as when mowing grass in spatially tight areas and areas adjoining fences and other obstacles.

SUMMARY OF THE INVENTION

The present invention was made in view of such problems associated with the prior art, and has a primary object to provide a walk behind mower which is convenient to operate.

To achieve such an object, the present invention provides a walk behind mower (10) including a driven wheel (13) rotatably supported by a body frame (11), a power source (14) for selectively driving the driven wheel, a dog clutch (23) provided in a power transmission path between the power source and the driven wheel, and a clutch actuating mechanism (24) interposed between the power source and the dog clutch for selectively disengaging the dog clutch; wherein the dog clutch includes an input end (23a) consisting of a first clutch half provided with teeth (231), an output end (23b) consisting of a second clutch half provided with teeth (232) configured to selectively mesh with the teeth of the first clutch half, and a spring member (26) interposed between the first clutch half and the second clutch half to normally urge the two clutch halves away from each other; and wherein the clutch actuating mechanism is configured to displace the two clutch halves toward each other against a biasing force of the spring member by using a drive force transmitted from the power source to the clutch actuating mechanism.

According to the walk behind mower having such features, mowing the grass on an uphill slope can be facilitated because the operator is aided by the powered rear wheels when is mowing uphill, and may cut off the power of the engine when mowing downhill so that the mower may back down under the gravitational force. Thereby, the operator is enabled to push and pull the mower up and down the hill in an effortless manner. Also, pushing and pulling the mower back and forth in spatially tight areas is facilitated. Thus, the mower is convenient to operate.

The walk behind mower may further comprise a centrifugal rotary clutch (45) interposed between the power source and the clutch actuating mechanism. In this case, when the power source should stall or otherwise cease supplying power, the power is not transmitted to the dog clutch so that the mower can be freely pushed and pulled, and the operator can move the mower to other desired places in an effortless manner.

According to a preferred embodiment of the present invention, the mower further includes an axle shaft (25) rotatably supported by the body frame and having a pair of driven wheels fixedly attached to either end thereof, a driven gear (22) rotatably supported by an intermediate part of the axle shaft, and a drive gear (21) rotatably supported by the body frame and connected to an output end of the power source; wherein the dog clutch (23) is coaxially mounted on the axle shaft in such a manner that the second clutch half is fixedly secured to the axle shaft and the first clutch half is rotatably supported on the axle shaft, and the clutch actuating mechanism (24) comprises at least one projection (230) projecting from one of the first clutch half and the driven gear, and at least one recess (220) provided in the other of the first clutch half and the driven gear, a cam mechanism being formed between the projection and the recess in such a manner that the first clutch half is displaced toward the second clutch half against a biasing force of the spring member when the drive force transmitted from the power source is transmitted to the clutch actuating mechanism. Typically, the cam mechanism includes a ramp surface formed in the at least one projection.

Thereby, the dog clutch and the clutch actuating mechanism can be combined as a highly compact and durable unit. To further enhance the compact design of the power transmission system, the drive gear may comprise a bevel gear fixedly supported by a driven shaft extending vertically while the driven gear comprises a bevel gear rotatably supported by the axle shaft in a coaxial relationship.

According to a particularly preferred embodiment of the present invention, the teeth of the first clutch half project axially toward the second clutch half, and the teeth of the second clutch half project axially toward the first clutch half, the spring member comprises a compression coil spring wound around a part of the axle shaft located between the two clutch halves to urge the two clutch halves away from each other.

BRIEF DESCRIPTION OF THE DRAWING(S)

DESCRIPTION OF THE PREFERRED EMBODIMENT(S)

A preferred embodiment of the present invention is described in the following with reference to the appended drawings.

Figure 1:
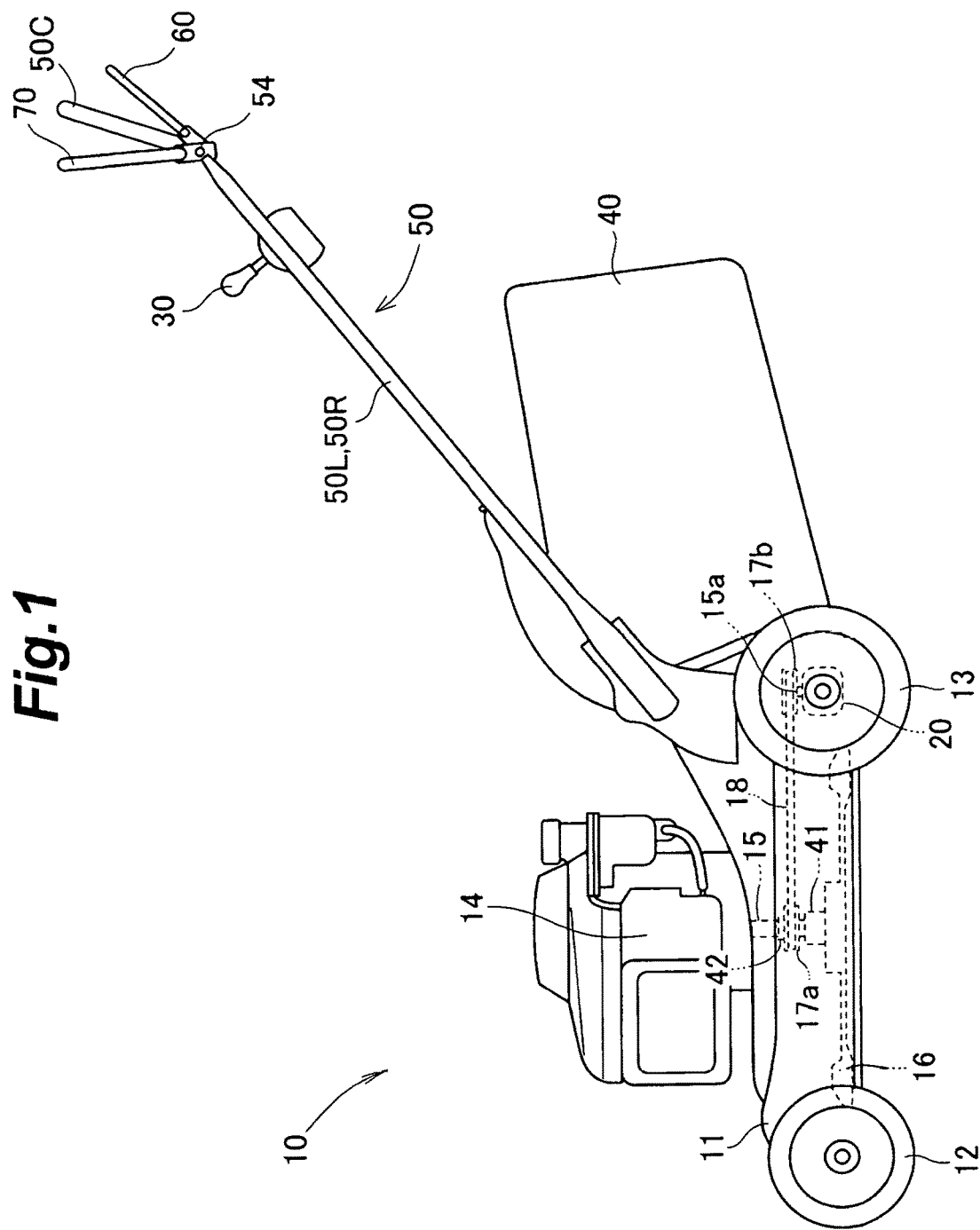
FIG. 1 is a left side view of a walk behind mower embodying the present invention.

As shown in FIG. 1 which is a side view of a walk behind lawn mower 10 embodying the present invention, the mower 10 of the illustrated embodiment includes a body frame 11, a pair of front wheels 12 positioned on either side of a front part of the body frame 11, and a pair of rear wheels 13 positioned on either side of a rear part of the body frame 11. While the front wheels 12 are free rolling wheels, the rear wheels 13 are powered as will be described hereinafter.

An engine 14 consisting of a vertical internal combustion engine (having a vertically extending crankshaft or an output shaft 15) is mounted on top of the body frame 11, and a cutter blade 16 is positioned centrally under the body frame 11, and is powered directly by the engine 14. The power of the engine 14 is also transmitted to the rear wheels 13 via a transmission system 20 provided in a lower rear part of the body frame 11.

More specifically, the output shaft 15 of the engine 14 is connected to the cutter blade 16, and is provided with a flywheel brake 41. The transmission system 20 for the rear wheels 13 includes a drive pulley 17a connected to the output shaft 15 via a drive clutch 42, a driven pulley 17b fitted on a vertical drive shaft 15a rotatably supported in a rear part of the body frame 11, and a belt 18 passed around the drive pulley 17a and the driven pulley 17b.

The mower 10 is further provided with a handle 50 having a pair of side rod members 50L and 50R extending obliquely rearwardly from a rear end of the body frame 11 and a cross member 50C extending laterally between the rear ends of the side rod members 50L and 50R. An engine throttle/choke lever 30 is attached to a part of the left side rod member 50L, and is connected to the corresponding part of the carburetor of the engine 14 via a cable although not shown in the drawings.

A flywheel brake lever 60 and a drive clutch lever 70, each consisting of a half loop member, are pivotally attached to upper parts of the side rod members 50L and 50R at respective ends. The flywheel brake lever 60 is connected to the flywheel brake 41 via a cable not shown in the drawings such that the flywheel brake 41 is released and an ignition circuit not shown in the drawings is closed when the flywheel brake lever 60 is held against the cross member 50C. When the flywheel brake lever 60 is released, and pivoted away from the cross member 50C, a brake is applied to the engine 14, and the ignition circuit opens.

When the drive clutch lever 70 is released, and pivoted away from the cross member 50C, as the drive clutch 42 is disengaged, the power of the engine 14 is disconnected from the transmission system 20, and the rear wheels 13 receive no power from the engine 14. When the drive clutch 42 is engaged by holding the drive clutch lever 70 against the cross member 50C, the power of the engine 14 is transmitted to the rear wheels 13 so that the mower 10 is propelled forward under the power of the engine 14.

When starting the engine 14, only the flywheel brake lever 60 is held against the cross member 50C. Once the engine 14 has started, the operator additionally holds the drive clutch lever 70 against the cross member 50C, and the mower 10 is propelled forward so that the lawn mowing can be initiated. The grass clippings cut by the blade 16 are blown into a grass bag 40 attached to the rear end of the body frame 11.

Figure 2:
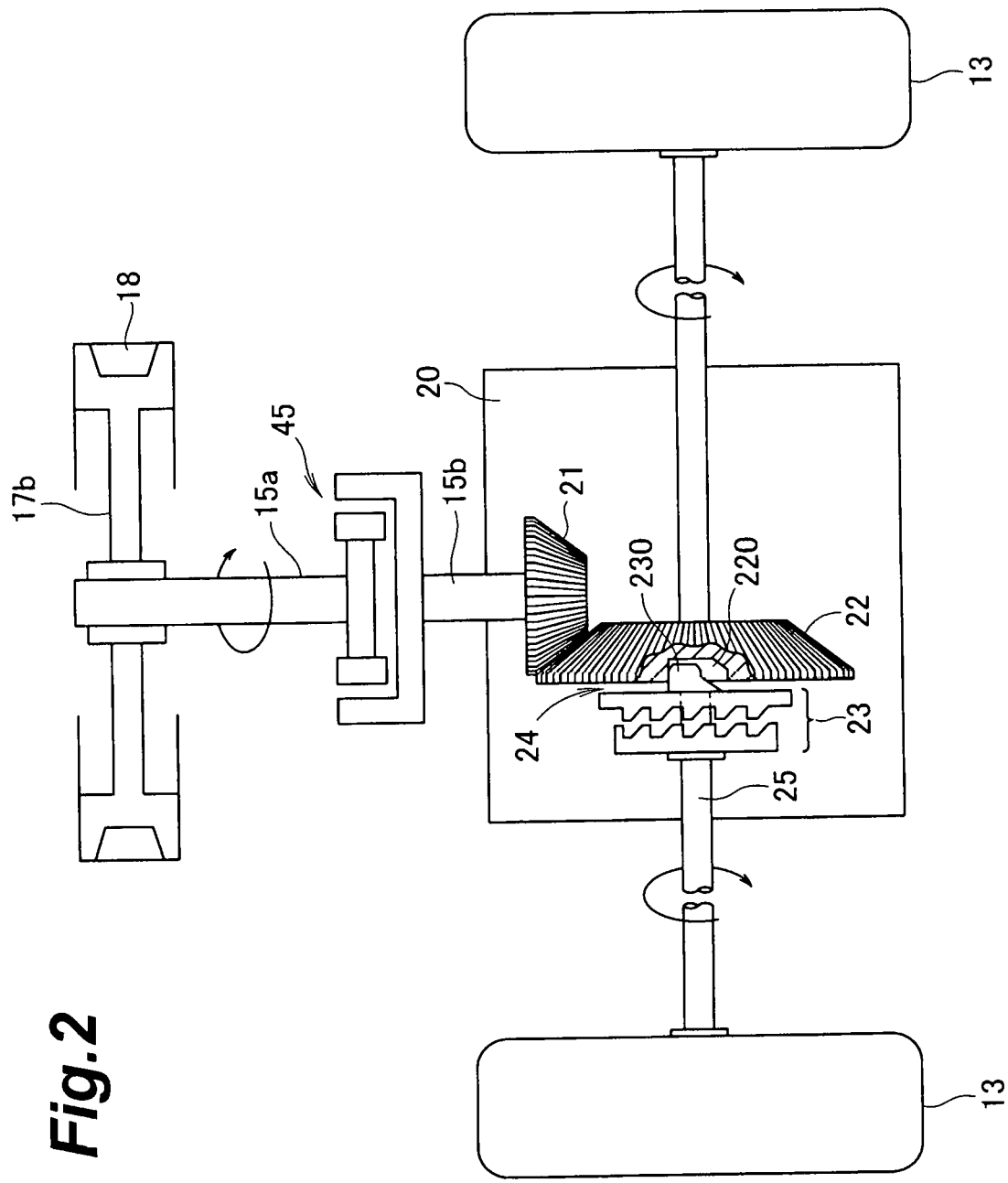
FIG. 2 is a diagram illustrating a main part of the power transmission system of the mower.

FIG. 2 shows a main part of the power transmission system 20. The vertical drive shaft 15a which is fitted with the driven pulley 17b at the upper end thereof is connected to an input end of a centrifugal rotary clutch 45. An output end of the centrifugal rotary clutch 45 is connected to a drive bevel gear 21 of the transmission system 20 via a driven shaft 15b. The centrifugal rotary clutch 45 is configured to connect the vertical drive shaft 15a to the drive bevel gear 21 in a power transmitting relationship when the input end or the vertical drive shaft 15a is rotating at more than a prescribed speed.

The output end of the centrifugal rotary clutch 45 is provided with a clutch drum having a clutch surface defined on the inner circumferential surface thereof, and the input end of the centrifugal rotary clutch 45 is provided with a spring loaded clutch shoes so that the clutch shoes may be forced radially outward against the spring force to frictionally engage the clutch surface when the input end of the centrifugal rotary clutch 45 is rotating at more than a prescribed rotational speed.

The transmission system 20 further includes an axle shaft 25 having the rear wheels 13 fixedly attached to either end thereof, a driven bevel gear 22 rotatably supported by the axle shaft 25 in a coaxial relationship and meshing with the drive bevel gear 21, and a dog clutch 23 having an input end coupled with the driven bevel gear 22 via a clutch actuating mechanism 24 and an output end coaxially fixed to the axle shaft 25.

Figure 3:
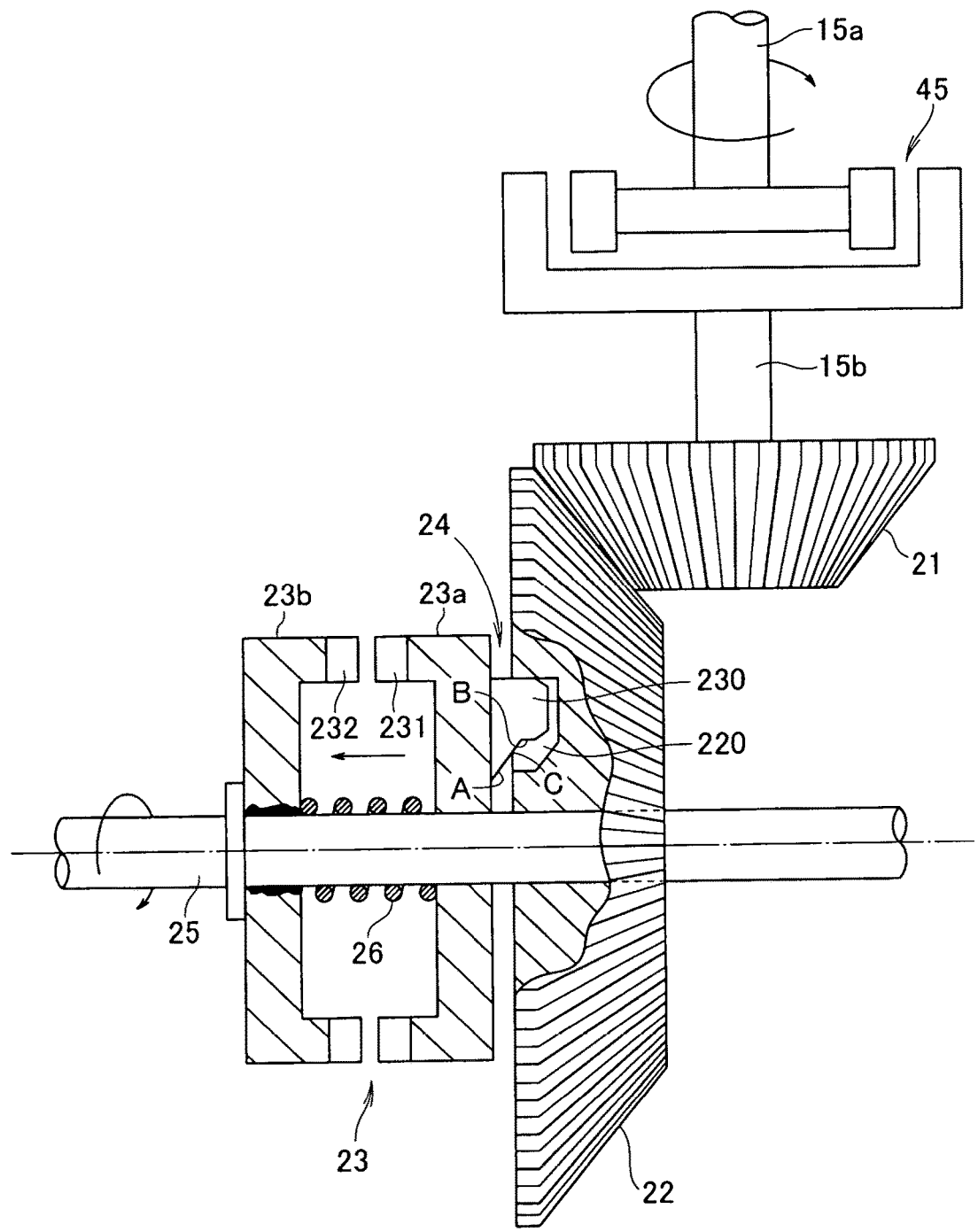
FIG. 3 is a simplified rear view of a part of the power transmission system partly in section.
Figure 4:
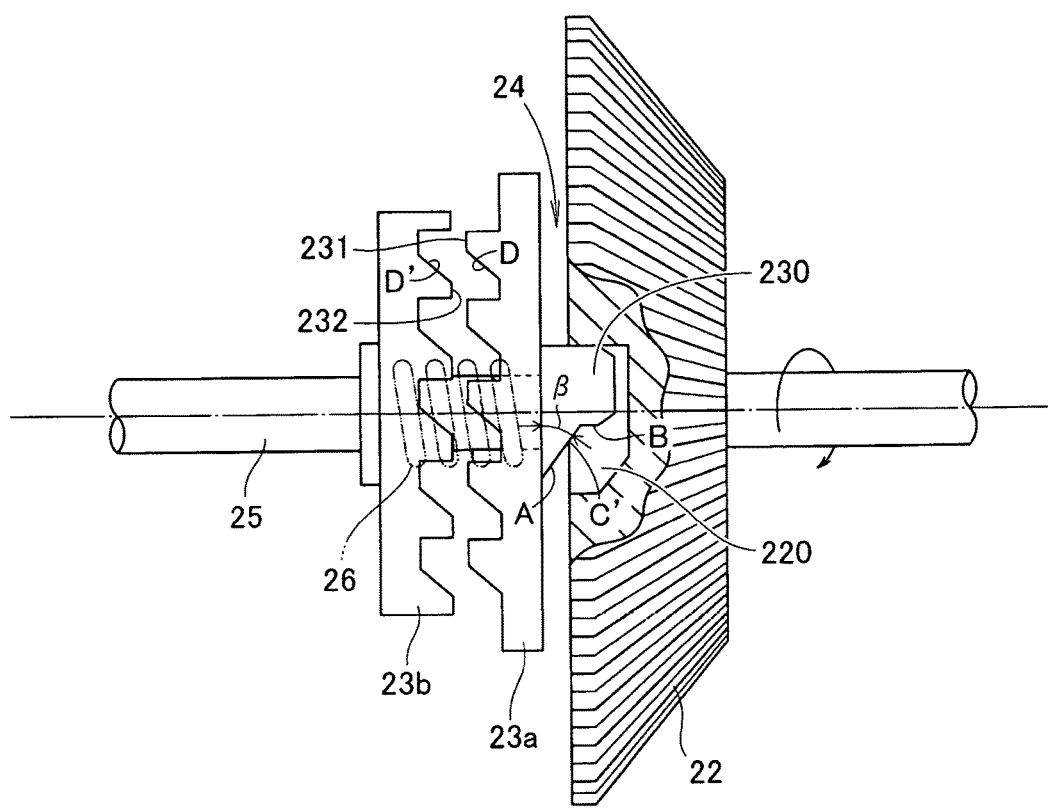
FIG. 4 is a simplified, partly broken away rear view of a part of the power transmission system.
Figure 6:
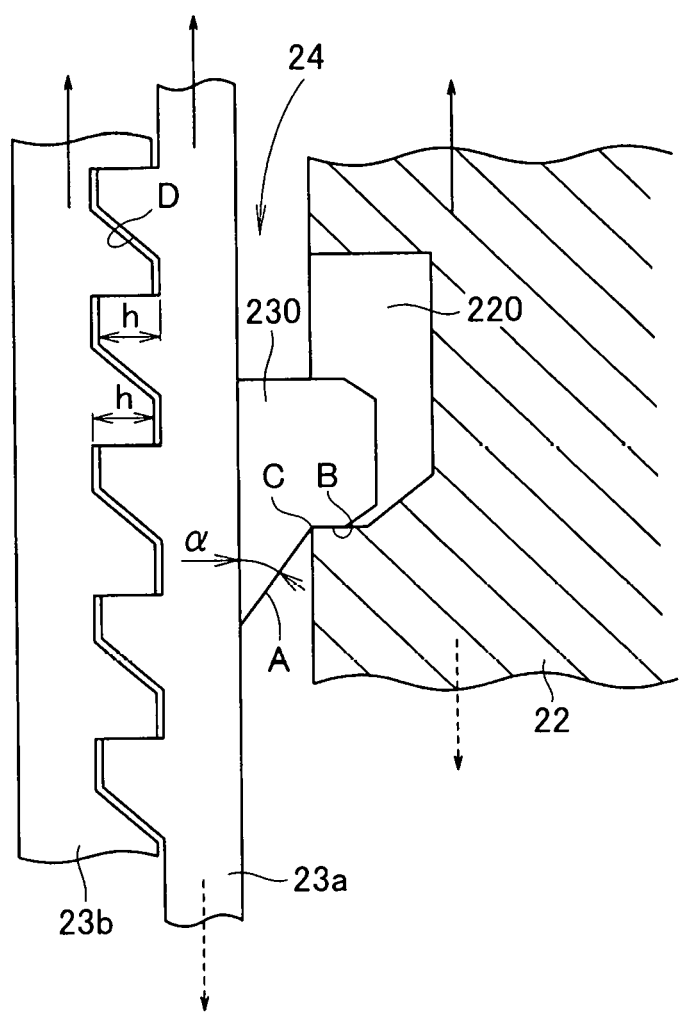
FIG. 6 is a diagram showing the relationship between the clutch actuating mechanism and the dog clutch which is actuated by the clutch actuating mechanism.
Figure 7:
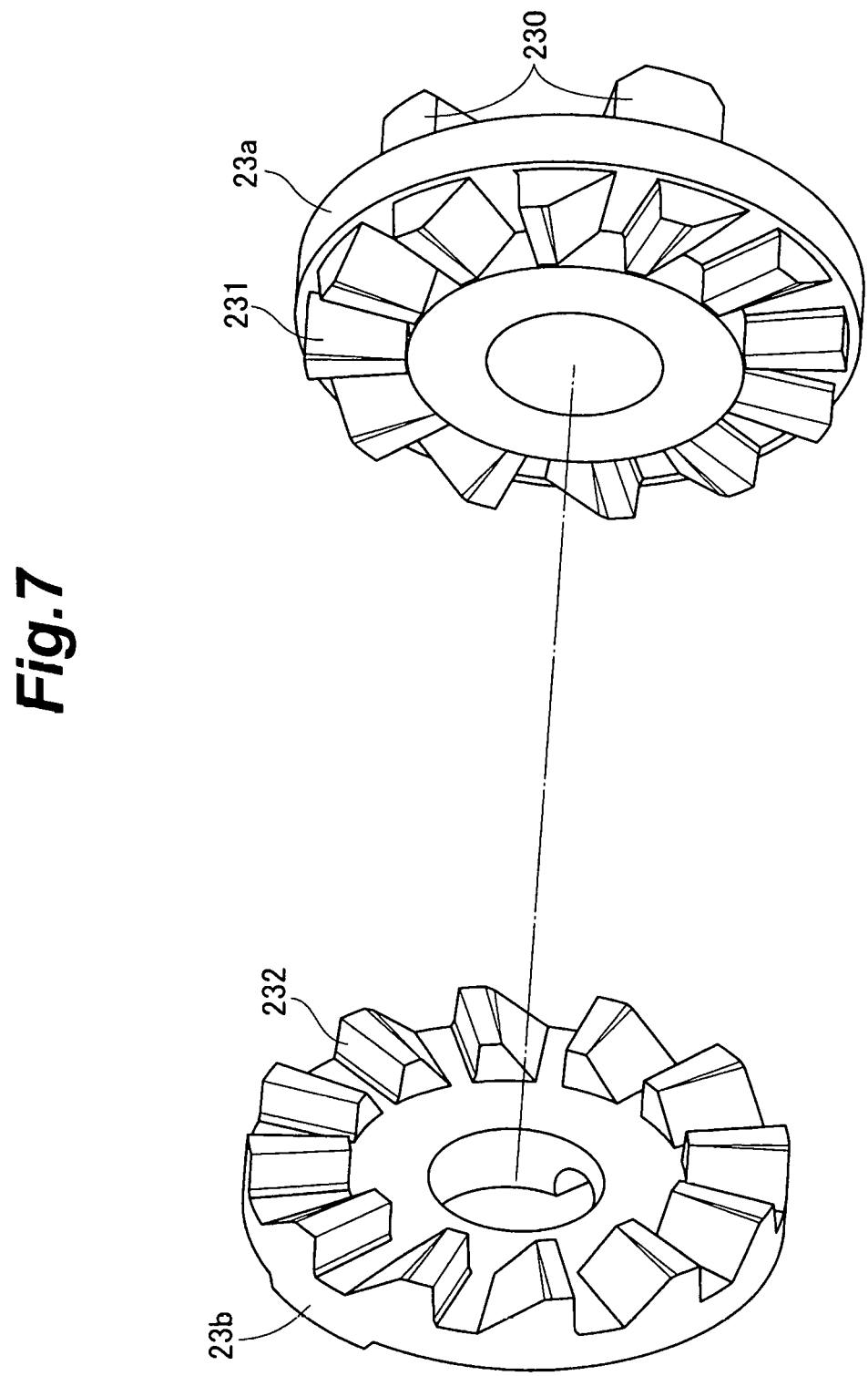
FIG. 7 is an exploded perspective view of the dog clutch.

As shown in FIGS. 3, 4 and 7, the dog clutch 23 is provided with a first clutch half 23a (the input end) having a plurality of teeth 231 projecting in the axial direction and arranged at a regular interval in a coaxial relationship. The first clutch half 23a is rotatably supported on the axle shaft 25. The dog clutch 23 is further provided with a second clutch half 23b (the output end) having a plurality of teeth 232 projecting in the axial direction toward the teeth 231 of the first clutch half 23a and arranged at a regular interval in a coaxial relationship in a similar fashion. The second clutch half 23b is fixedly attached to the axle shaft 25. The two sets of teeth 231 and 232 are configured to mesh with each other in a power transmitting relationship when the two clutch halves 23a and 23b are axially brought together. As best illustrated in FIG. 4, the teeth 231 and 232 are each provided with an asymmetric trapezoidal shape (as seen along the circumferential direction) including an upright surface and a slanted ramp surface (D, D'). When the two clutch halves 23a and 23b are axially brought together as shown in FIG. 6, depending on the relative rotational direction between the first clutch half 23a and the second clutch half 23b, the opposing upright surfaces abut each other or the opposing ramp surfaces D and D' abut each other as the case may be.

The clutch actuating mechanism 24 includes a plurality (four, in the illustrated embodiment) of recesses 220 formed on the back side of the driven bevel gear 22 at a regular angular interval in a coaxial relationship, and a same number of projections 230 projecting axially from the back side of the first clutch half 23a (facing away from the teeth 231 thereof) and received in the corresponding recesses 220.

A compression coil spring 26 is wound around the part of the axle shaft 25 located between the two clutch halves 23a and 23b, and normally urges the first clutch half 23a away from the second clutch half 23b. The first clutch half 23a is moveable in the axial direction away from the second clutch half 23b at least by a stroke large enough for the two sets of teeth 231 and 232 to be disengaged from each other.

Figure 5:
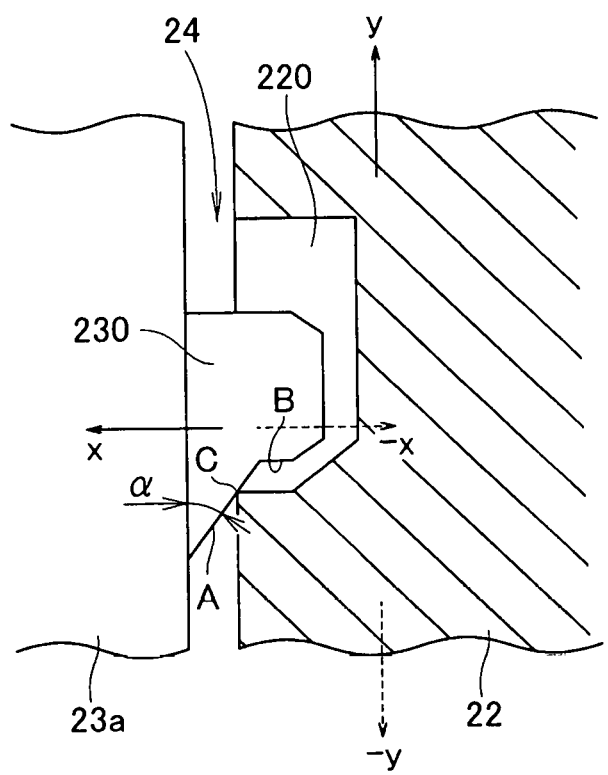
FIG. 5 is a diagram illustrating a part of the clutch actuating mechanism.

As shown in FIGS. 3, 4 and 5, each recess 220 is provided with a pair of upright wall surfaces on either circumferential end thereof which are perpendicular to the planar back surface of the driven bevel gear 22 (which is in turn perpendicular to the central axial line of the axle shaft 25). One of the circumferential ends of each projection 230 is defined by an upright wall surface which is perpendicular to the planar back surface of the driven bevel gear 22 and a chamfer surface extending in that order from the base end of the projection 230, and the other circumferential end of the projection 230 is defined by a ramp surface A, a small upright surface B and a chamfer surface extending in that order from the base end of the projection 230.

During the normal operation of the mower 10, the vertical drive shaft 15a rotates in clockwise direction when viewed from above owing to the rotative power of the engine 14 transmitted thereto via the belt 18, and this in turn causes the driven shaft 15b to rotate in the same direction via the centrifugal rotary clutch 45. This causes one of the upright wall surfaces of each recess 220 to be pushed against the ramp surface A of the corresponding projection 230. This in turn causes an axial movement of the first clutch half 23a toward the second clutch half 23b against the spring force of the compression coil spring 26. As a result, the dog clutch 23 becomes engaged, and the rotational power of the engine 14 is transmitted to the axle shaft 25 and, hence, to the two rear wheels 13.

When the power of the engine 14 is not transmitted to the driven bevel gear 22 owing to the disengagement of the drive clutch 42 and/or the rotary clutch 45, the first clutch half 29a is pushed away from the second clutch half 29b under the spring force of the compression coil spring 26 so that the dog clutch 29 is disengaged, and the axle shaft 25 is left freely rotatable. Each recess 220 is deep enough to accommodate the necessary travel of the first clutch half 29a.

Figure 8:
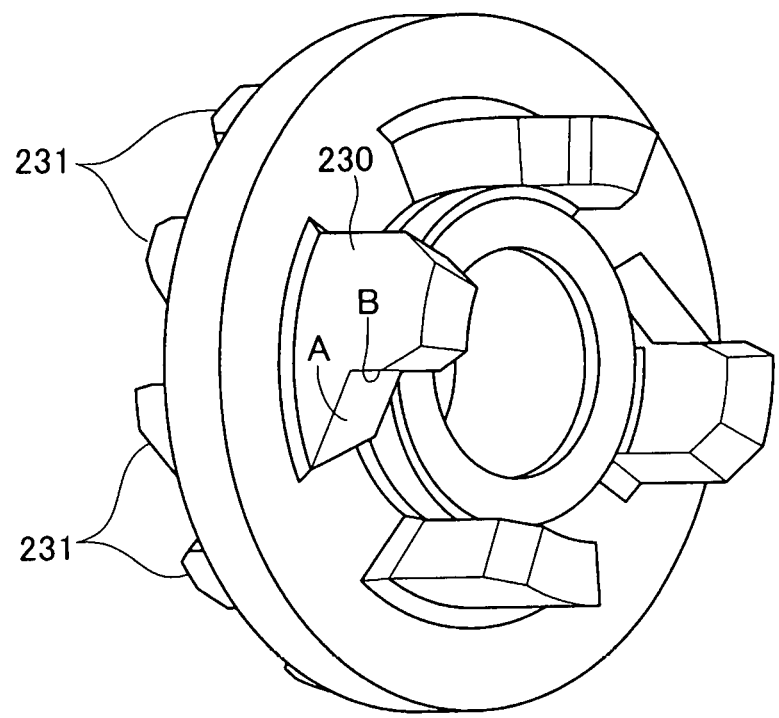
FIG. 8 is a perspective view of the back side of the first clutch half of the dog clutch provided with the projections forming a part of the clutch actuating mechanism.

FIGS. 5, 6 and 8 show the details of the clutch actuating mechanism 24. Each projection 230 has a rectangular base, and four sides extending away from the base. One of the sides of each projection 230 facing the circumferential direction is provided with the ramp surface A, the upright flat surface B and the chamfer surface, in that order from the base. As best shown in FIG. 5, as the driven bevel gear 22 rotates in the normal direction indicated by a solid arrow (y), an outer corner C of the recess 220 rides over the ramp surface A so that the first clutch half 23a is pushed toward the second clutch half 23b as indicated by a solid arrow (x). As a result, the dog clutch 23 becomes engaged.

The upright flat surface B serves as a stopper for keeping the dog clutch 23 engaged. The sloping angle α and the total height of the ramp surface A may be determined appropriately in consideration of the height h of the teeth 231 and 232 of the first clutch half 22a and the second clutch half 23b.

The other side of each projection 230 facing the opposite circumferential direction is provided with an upright flat surface and a chamfer surface, in that order from the base. As the driven bevel gear 22 rotates in the direction indicated by an imaginary arrow (−y), the upright flat surface of each projection 230 and the upright surface of the corresponding recess 220 abut each other so that the rotation of the driven bevel gear 22 is transmitted to the first clutch half 23a, but the dog clutch 23 is disengaged owing to the displacement of the first clutch half 23a away from the second clutch half 23b under the biasing force of the compression coil spring 26 as indicated by an imaginary arrow (−x).

Thus, when no power is transmitted from the engine 14, and the rotary clutch 45 is thereby disengaged, the dog clutch 23 is disengaged under the biasing force of the compression coil spring 26 so that the axle shaft 25 is placed in a free rolling condition. Hence, the rear wheels 13 are also placed in a free rolling condition.

Owing to the presence of the compression coil spring 26 between the two clutch halves 23a and 23b of the dog clutch 23, when the power of the engine 14 is not being transmitted to the input end of the dog clutch 23, the dog clutch 23 is disengaged, and the rear wheels 13 are also placed in a free rolling condition.

FIGS. 7 and 8 show the details of the two clutch halves 23a and 23b. The first clutch half 23a essentially consists of a disk member, and the dog clutch teeth 231 project from one of the end surfaces of the first clutch half 23a opposing the second clutch half 23b at a regular angular interval. The corresponding dog clutch teeth 232 project from the corresponding end surface of the second clutch half 23b opposing the second clutch half 23b at a regular angular interval.

The projections 230 constituting the clutch actuating mechanism 24 project from the other end surface of the first clutch half 23a also at a regular angular interval. The projections 230 are received in the corresponding recesses 220 of the driven bevel gear 22, and a camming action is caused by these two cooperating parts so that the first clutch half 23a is pushed toward the second clutch half 23b when a drive force is transmitted to the first clutch half 23a. Thereby, the dog clutch 23 is engaged. When no drive force is transmitted to the first clutch half 23a, owing to the spring force of the compression coil spring 26, the first clutch half 23a is pushed away from the second clutch half 23b. Thereby, the dog clutch 23 is disengaged. Thus, the projection 230 and the recesses 220 jointly form a cam mechanism that coverts the rotational motion of the driven gear 22 into an axial movement of the first clutch half 23a.

According to the illustrated embodiment, the mower 10 is propelled by the power of the engine 14 in a normal lawn mowing operation, and this allows the lawn mowing operation to be performed in a relatively effortless manner for the operator. However, when mowing certain areas such as a slope and an area near a wall or any obstacle, the operator may desire to turn off the propelling power for the rear wheels 13. Conventional mowers were typically equipped with a clutch for disconnecting the power transmission from the engine to the driven wheels. However, the clutch was positioned on the output end of the engine so that even when the engine is disconnected, the driven wheels are still connected to various components of the power transmission system. Therefore, even when the engine is disconnected, pushing or pulling the mower required a significant effort because the frictional resistance and the inertia of the various component parts of the transmission system are significant.

The conventional mowers were also typically equipped with a centrifugal rotary clutch, but the centrifugal rotary clutch may fail to be fully disengaged even when no power is transmitted from the engine, because the pushing and/or the pulling of the mower may cause the rotary clutch to rotate at a high speed. In such a case, the operator who is trying to manually pull or push the mower may encounter a significant resistance. However, according to the illustrated embodiment, when the power of the engine is not transmitted to the powered wheels, the operator is enabled to manually push and/or pull the mower in an effortless manner at all times.

Thus, the mower of the illustrated embodiment is highly convenient when the mower is required to go back and forth frequently typically to cut grass in spatially tight areas.

Although the present invention has been described in terms of a preferred embodiment thereof, it is obvious to a person skilled in the art that various alterations and modifications are possible without departing from the scope of the present invention which is set forth in the appended claims. The contents of the original Japanese patent application on which the Paris Convention priority claim is made for the present application as well as the contents of the prior art references mentioned in this application are incorporated in this application by reference.

The invention claimed is:

1. A walk behind mower including a driven wheel rotatably supported by a body frame, a power source for selectively driving the driven wheel, a dog clutch provided in a power transmission path between the power source and the driven wheel, and a clutch actuating mechanism interposed between the power source and the dog clutch for selectively disengaging the dog clutch;
   wherein the dog clutch includes an input end consisting of a first clutch half provided with teeth, an output end consisting of a second clutch half provided with teeth configured to selectively mesh with the teeth of the first clutch half, and a spring member interposed between the first clutch half and the second clutch half to normally urge the two clutch halves away from each other;
   wherein the clutch actuating mechanism is configured to displace the two clutch halves toward each other against a biasing force of the spring member by using a drive force transmitted from the power source to the clutch actuating mechanism;
   wherein the walk behind mower further includes a centrifugal rotary clutch interposed between the power source and the clutch actuating mechanism;
   wherein the walk behind mower further includes an axle shaft rotatably supported by the body frame and having a pair of driven wheels fixedly attached to either end thereof, a driven bevel gear rotatably supported by an intermediate part of the axle shaft, a drive bevel gear fixedly supported by a driven shaft extending vertically, the drive bevel gear being connected to an output end of the centrifugal rotary clutch via the driven shaft and meshing with the driven bevel gear;
   wherein the dog clutch is coaxially mounted on the axle shaft in such a manner that the second clutch half is fixedly secured to the axle shaft and the first clutch half is rotatably supported on the axle shaft; and
   wherein the clutch actuating mechanism comprises a cam mechanism formed between the driven bevel gear and the first clutch half in such a manner that the first clutch half is displaced toward the second clutch half against a biasing force of the spring member when the drive force is transmitted from the power source to the driven bevel gear via the centrifugal rotary clutch and the drive bevel gear, and wherein the first clutch half is disengaged from the second clutch half under the biasing force of the spring member when the drive force is not transmitted from the power source to the driven bevel gear.

2. The walk behind mower according to claim 1, wherein the clutch actuating mechanism comprises at least one projection projecting from one of the first clutch half and the driven bevel gear, and at least one recess provided in the other of the first clutch half and the driven bevel gear, the cam mechanism being formed between the projection and the recess.

3. The walk behind mower according to claim 2, wherein the cam mechanism includes a ramp surface formed in the at least one projection.

4. The walk behind mower according to claim 1, wherein the teeth of the first clutch half project axially toward the second clutch half, and the teeth of the second clutch half project axially toward the first clutch half, the spring member comprises a compression coil spring wound around a part of the axle shaft located between the two clutch halves to urge the two clutch halves away from each other.

5. The walk behind mower according to claim 1, further comprising a drive clutch interposed between the power source and an input end of the centrifugal rotary clutch, wherein the drive clutch is configured to be selectively engaged according to an operation by an operator.

\* \* \* \* \*